United States Patent [19]

Yoshida et al.

[11] Patent Number: 4,673,617
[45] Date of Patent: Jun. 16, 1987

[54] THIN FILM MAGNETIC RECORDING MEDIA

[75] Inventors: Hideki Yoshida, Nishinomiya; Koichi Shinohara, Kobe; Takashi Suzuki, Takatsuki, all of Japan

[73] Assignee: Matsushita Electric Industrial Co., Ltd., Osaka, Japan

[21] Appl. No.: 727,083

[22] Filed: Apr. 25, 1985

[51] Int. Cl.⁴ .................................................. G11B 5/62
[52] U.S. Cl. ...................................... 428/323; 428/329; 428/330; 428/331; 428/694; 428/900
[58] Field of Search ............... 428/323, 329, 330, 331, 428/694, 900; 427/128, 129, 131

[56] References Cited

U.S. PATENT DOCUMENTS

| | | | |
|---|---|---|---|
| 4,362,767 | 12/1982 | Nouchi et al. | 427/128 |
| 4,461,797 | 7/1984 | Adachi et al. | 428/331 |
| 4,489,117 | 12/1984 | Ono et al. | 428/694 |
| 4,539,265 | 9/1985 | Yazawa | 428/694 |
| 4,540,618 | 9/1985 | Suzuki et al. | 428/694 |
| 4,548,855 | 10/1985 | Ono et al. | 428/329 |
| 4,567,116 | 1/1986 | Sawada | 428/900 |
| 4,568,600 | 2/1986 | Ono et al. | 428/694 |
| 4,578,729 | 3/1986 | Suzuki et al. | 428/694 |

*Primary Examiner*—George F. Lesmes
*Assistant Examiner*—William M. Atkinson
*Attorney, Agent, or Firm*—Stevens, Davis, Miller & Mosher

[57] ABSTRACT

A thin film magnetic recording medium has a shape imparting substance disposed on a substrate, and a thin-film layer including at least a magnetic layer formed on the shape imparting substance. The area of each of the projecting portions of the thin-film layer which are formed by virtue of the shape imparting substance is set such as to be more than four times as large as the area of each of the particles of the shape imparting substance. The center line of each of the projecting portions of the thin-film layer may be made offset from the center line of the corresponding particle of the shape imparting substance. Thus, it is possible for the thin film magnetic recording medium to display excellent electromagnetic response properties and runability as well as durability even under a harsh environment.

2 Claims, 10 Drawing Figures

THIN FILM MAGNETIC RECORDING MEDIA

BACKGROUND OF THE INVENTION

1. Field of the Invention

The present invention relates to thin film magnetic recording media such as a magnetic tape and a magnetic disk.

2. Description of the Prior Art

Recently, thin film magnetic recording media have attracted interest as high-density magnetic recording media and have gradually been put into practical use. It is well known that thin film magnetic recording media display remarkably excellent electromagnetic response properties in high-density magnetic recording operations as compared with the coating type magnetic recording media which have heretofore been employed. However, it is still necessary for thin film magnetic recording media to be improved in their practical properties for the purpose of their practical application as high-density magnetic recording media. The required improvements in the practical properties of thin film magnetic recording media may be roughly classified as follows:

(1) control of the surface configuration
(2) improvements in the practical properties in terms of coating
(3) improvements in quality of materials Among these, the present invention is concerned with the control of the surface configuration of thin film magnetic recording media.

In high-density magnetic recording, losses in recording and reproducing operations as a result of spacing loss generally involve an extremely serious problem. For this reason, it is desired to improve the surface properties of thin film magnetic recording media. If the surface properties of thin film magnetic recording media are improved, however, although electromagnetic response properties are improved, runability and durability are impaired. Therefore, various surface configurations have been examined in order to improve the runability and durability as well as electromagnetic response properties.

The following is a description of a conventional thin film magnetic recording medium.

Referring to FIG. 1 which is a sectional view of a conventional thin film magnetic recording medium, the reference numeral 1 denotes a substrate, 2 each of the particles of a shape imparting substance, 3 a thin-film layer which includes at least a magnetic layer, and 4 projecting portions of the thin-film layer 3. It is possible by this arrangement to improve the electromagnetic response properties together with the runability and durability of a thin film magnetic recording medium by employing the substrate 1 which has relatively excellent surface properties and controlling the surface properties of the medium by the use of the shape imparting substance 2, as shown in FIG. 1. The above-described arrangement, however, suffers from the following problem. Namely, under a normal environment such as at 23° C. and 50% RH, the electromagnetic response properties, runability and durability of the medium are all satisfactory, but under a harsh environment such as at 40° and 95%RH, although the electromagnetic response properties and runability are still excellent, durability is not satisfactory.

SUMMARY OF THE INVENTION

In view of the above-described problem of the prior art, it is a primary object of the present invention to provide thin film magnetic recording media capable of displaying excellent electromagnetic response properties together with satisfactory runability and durability even under a harsh environment of, e.g., 40° C. and 95%RH.

To this end, the present invention provides a thin film magnetic recording medium having a shape imparting substance disposed on a substrate, and a thin-film layer including at least a magnetic layer formed on the shape imparting substance, wherein the area of each of the projecting portions of the thin-film layer which are formed by virtue of the shape imparting substance is more than four times as large as the area of each of the particles of the shape imparting substance, or wherein the center line of each of the projecting portions of the thin-film layer is not coincident with the center line of the corresponding particle of the shape imparting substance.

By virtue of the above-described arrangement, it is possible for the thin film magnetic recording medium to display excellent electromagnetic response properties together with satisfactory runability and durability even under a harsh environment.

The above and other objects, features and advantages of the present invention will become clear from the following description of the preferred embodiments thereof, taken in conjunction with the accompanying drawings.

DESCRIPTION OF THE PREFERRED EMBODIMENTS

The present invention will be described hereinunder through embodiments with reference to the accompanying drawings.

Figure 2:
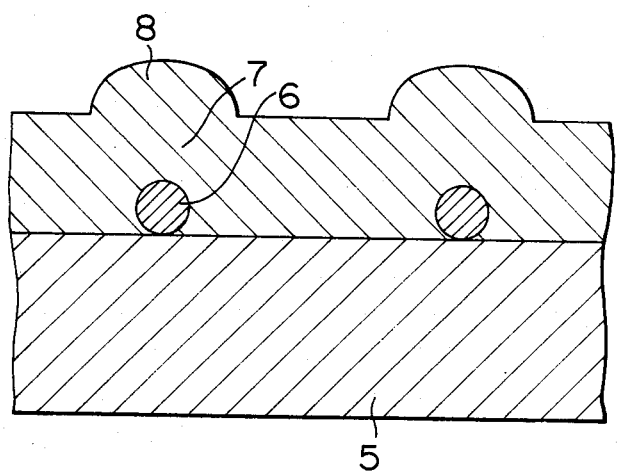
FIGS. 2, 3 and 5 are sectional views showing respectively examples of the thin film magnetic recording medium in accordance with various embodiments of the present invention.

Referring first to FIG. 2, which is a sectional view showing one example of the basic arrangement of the thin film magnetic recording medium in accordance with one embodiment of the present invention, the reference numeral 5 denotes a substrate, 6 particles of a shape imparting substance, 7 a thin-film layer including at least a magnetic layer, and 8 projecting portions of the thin-film layer 7.

By virtue of the shape imparting substance 6 disposed on the substrate 5, the surface of the thin-film layer 7 which includes at least a magnetic layer is formed with the projecting portions 8 each having an area four or more times as large as the area of each of the particles of the shape imparting substance 6 in the manner shown in FIG. 2. It is to be noted that the term "area" is herein employed to mean the horizontal cross sectional area of each of the particles of the shape imparting substance 6 or each of the projecting portions 8 at the respective points thereof where their circumference is at its maximum.

Figure 3:
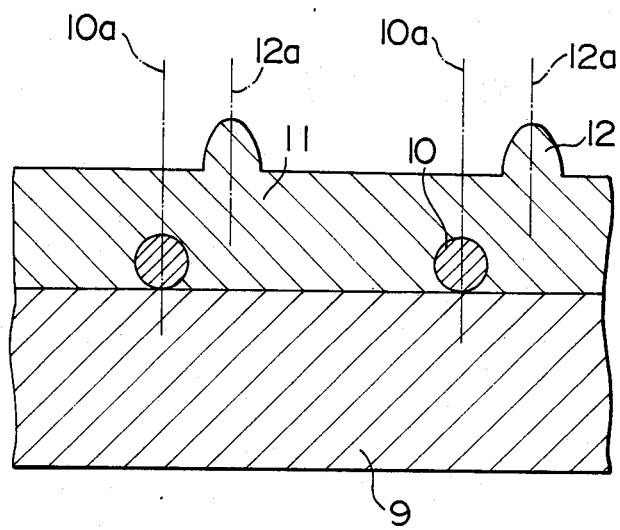

Referring next to FIG. 3, which is a sectional view showing another example of the basic arrangement of the thin film magnetic recording medium in accordance with another embodiment of the invention, the reference numeral 9 represents a substrate, 10 each of the particles of a shape imparting substance, and 11 a thin-film layer including at least a magnetic layer. The shape imparting substance 10 which is disposed on the substrate 9 causes the thin-film layer 11 to have projecting portions 12 on its surface. In this case, the center line 12a of each of the projecting portions 12 of the thin-film layer 11 is, as shown in FIG. 3, not coincident with the center line 10a of the corresponding particle of the shape imparting substance 10.

The material for the substrates 5 and 9 may be properly selected from metals, oxides, nitrides and so forth. As to the shape imparting substances 6 and 10, it is possible to solely employ nuclei or particles of a material which is properly selected from oxides, nitrides, metals and other materials, or employ a combination of nuclei and a binder material. Each of the thin-film layers 7 and 11 is constituted by a single layer or a plurality of layers made of a material selected from metals, oxides and nitrides, or a mixture of materials selected therefrom, each thin-film layer including at least a magnetic layer. The method of forming the thin-film layers 7 and 11 is properly selected from sputtering, vacuum deposition, ion plating, deposition, coating and so forth. Each of the thin-film layers 7 and 11 may include an anti-corrosive agent, a lubricant, an abrasive, etc., in addition to the magnetic film. The surface roughness of the substrates 5 and 9 at the side thereof which is closer to the magnetic surface of the medium is preferably set at an average roughness of 1,000 Å or less, more preferably 300 Å or less. The particle diameter of the shape imparting substances 6 and 10 is preferably selected to fall between 20 Å and 1,000 Å, more preferably between 40 Å and 400 Å. The particle distribution density of each of the shape imparting substances 6 and 10 is preferably 0.1 to 1,000 particles per $\mu m^2$, more preferably 1 to 100 particles per $\mu m^2$. The film thickness of each of the thin-film layers 7 and 11 is preferably selected to fall between 500 Å and 5,000 Å, and the film thickness of the magneitc layer preferably between 500 Å and 2,000 Å.

Figure 1:
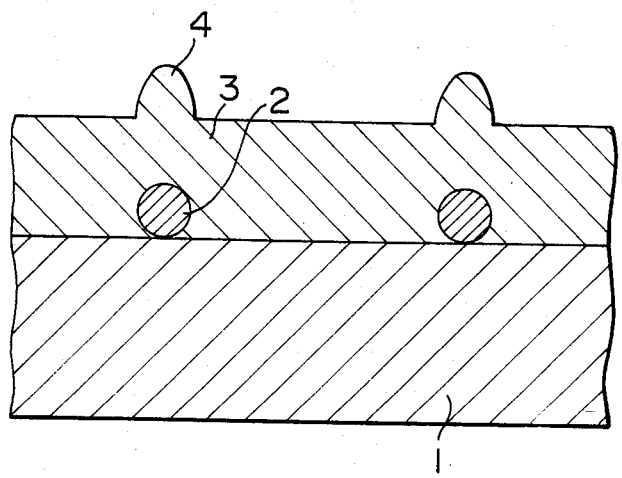
FIG. 1 is a sectional view of a conventional thin film magnetic recording medium.

There is a large difference in terms of the area between the respective projecting portions of the thin-film layers which are respectively shown in FIGS. 1 and 2. It is possible to vary the area of each of the projecting portions of the thin-film layer by controlling the conditions in which the thin-film layer is formed, such as, for example, an atmospheric gas, such as Ar or He, in vacuum deposition, ion plating or sputtering.

It is conjectured that the thin film magnetic recording medium arranged as above involves a low packing factor in the vicinity of each of the particles of the shape imparting substance and therefore contains voids at such a portion. It is therefore surmised that the existence of such voids favorably reduces the magnitude of the stress transmitted to the substrate portion and consequently improves the durability of the thin film magnetic recording medium.

Referring to FIGS. 1 and 3, in the arrangement shown in FIG. 1 each projecting portion 4 of the thin-film layer 3 is formed in symmetry with respect to the corresponding particle of the shape imparting substance 2, whereas in the arrangement shown in FIG. 3 each projecting portion 12 of the thin-film layer 11 is formed asymmetrical with respect to the corresponding particle of the shape imparting substance 10. It is possible to obtain such asymmetry by varying conditions for forming the thin-film layer, for example, by controlling an atmospheric gas, or properly selecting a deposition material, or employing a special evaporation source or heating treatment, in vacuum deposition, ion plating or sputtering.

Figure 4:
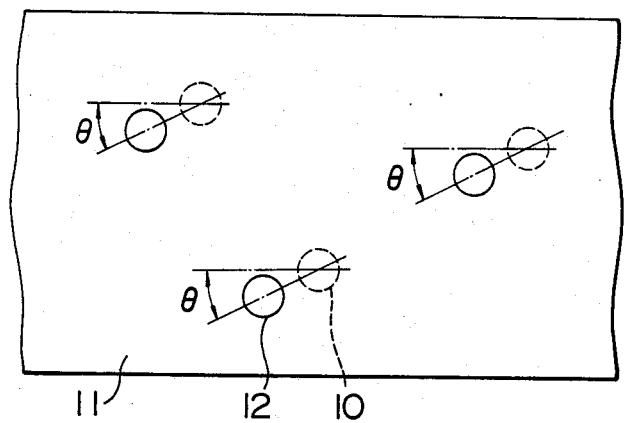
FIG. 4 is a plan view of the embodiment of the present invention shown in FIG. 3.

Referring next to FIG. 4 which is a plan view of the arrangement shown in FIG. 3, an offset angle $\theta$ is made between the longitudinal direction of the substrate 9 and an imaginary line connecting the center line of each of the particles of the shape imparting substance 10 and the corresponding projecting portion 12 of the thin-film layer 11.

Figure 5:
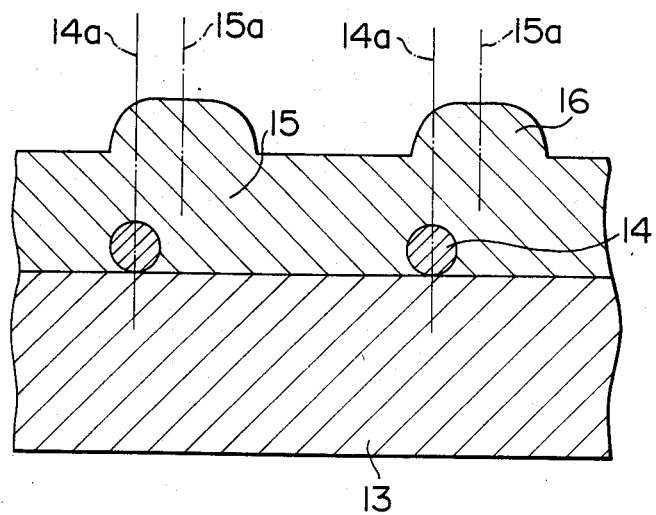

Further, although in the arrangement shown in FIG. 3 the area of each of the projecting portions 12 of the thin-film layer 11 is substantially equal to the area of each of the particles of the shape imparting substance 10, the present invention also includes such an arrangement as shown in FIG. 5 in which the area of each of the projecting portions 16 of a thin-film layer 15 is larger than the area of each of the particles of a shape imparting substance 14. When the area of each of the projecting portions 16 of the thin-film layer 15 is more than four times as large as the area of each of the particles of the shape imparting substance 14, the present invention offers a particularly remarkable effect. In FIG. 5, the reference numeral 13 denotes a substrate, 14 particles of a shape imparting substance, 15 a thin-film layer, 14a the center line of each of the particles of the shape imparting substance 14, and 16a the center line of each of the projecting portions 16 of the thin-film layer 15.

It is possible to confirm the offset distance between the center line of each of the particles of the shape imparting substance and the center line of the corresponding projecting portion of the thin-film layer by observing the cross-section of the thin film magnetic recording medium with a scanning electron microscope. The measurement limit of the existent analyzing techniques is on the order of 100 Å in terms of the above-described offset distance although it depends on the materials employed for the thin-film layer and the shape imparting substance. However, it has been confirmed that a sample which involves a center line offset distance of more than 100 Å has improved durability, this being offered by the present invention.

It is considered that the thin film magnetic recording medium arranged as above is asymmetric in the vicinity of each of the particles of the shape imparting substance and, therefore, the stress concentration which takes place when force acts on the surface of the projecting portions of the thin-film layer has a greatly intensified factor of asymmetry. For this reason, although the thin film magnetic recording medium which has the symmetric projecting portions, such as that shown in FIG. 1, has a durability which is constant when the medium is caused to travel in any direction, the thin film magnetic recording medium according to the invention, such as that shown in FIG. 3, has a durability which greatly differs depending on the travelling direction. It is therefore conjectured that it is possible to obtain even better durability by selecting a specific travelling direction.

Further, the effect offered by the arrangement shown in FIG. 2 and the effect offered by the arrangement shown in FIG. 3 are independent from each other. Therefore, if these effects are simultaneously employed, it is possible to obtain a greater effect by virtue of synergism.

The following is a description of more practical embodiments of the present invention.

Figure 6:
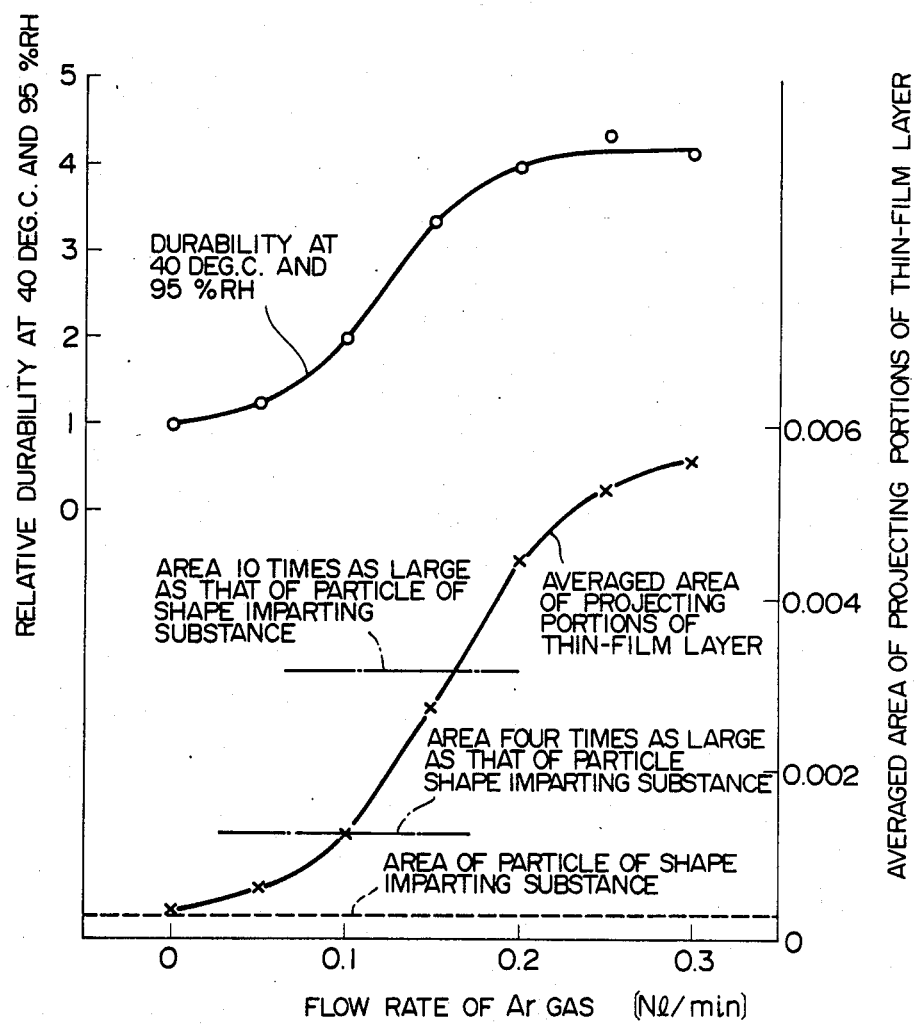
FIG. 6 is a characteristic chart showing the relationship between the average area of projecting portions of the thin-film layer constituting the thin film magnetic recording medium in accordance with one embodiment of the present invention and its durability at 40° C. and 95%RH.

Embodiment 1:

As the substrate, a polyethylene terephthalate substrate was employed having a thickness of 12 $\mu$m and an average surface roughness of 50 Å on the side thereof which was closer to the magnetic surface of the medium. As the shape imparting substance, $SiO_2$ particles with an average particle diameter of 150 Å and Baylon resin were mixed in isopropyl alcohol and applied to the surface of the substrate. The density of the $SiO_2$ particles in the mixed solution was 200 ppm, while the density of the Baylon resin was 100 ppm, and the particle density of the thus formed shape imparting substance was about 40 particles per $\mu m^2$. Then, while the substrate was being run along a cylindrical can with a diameter of 500 mm, CoNi (20wt %) was deposited on the surface of the substrate coated with the shape imparting substance up to a minimum incident angle of 40° from the tangential direction at a substrate travelling speed of 20 m/min. In order to obtain proper magnetic properties, oxygen gas was introduced, and the degree of vacuum in the vicinity of the deposition portion was maintained at 1 to $2 \times 10^{-3}$ Pa. While doing so, a magnetic layer with a film thickness of 1,800 Å was formed, and a sample A was thus obtained. Then, in addition to the above-described conditions, Ar gas was introduced in the vicinity of the deposition portion in the tangential direction and at various flow rates, that is, 0.05, 0.1, 0.15, 0.2, 0.25 and 0.3 Nl/min, thereby samples B, C, D, E, F and G were obtained. Each of the samples was provided with a back coat layer and coated with a fluorine lubricant at the side of the sample which was closer to the magnetic layer. Then, the durability of the samples was measured by employing a deck with a rotary cylinder in an environment of 40° C. and 95%RH FIG. 6 shows the respective relative durabilities of the samples with respect to the durability of the sample A. Further, the respective surface conditions of the samples were observed by means of a scanning electron microscope. This observation showed that the projecting portions of the thin-film layer formed by virtue of the shape imparting substance employing $SiO_2$ as nuclei were substantially circular. The average diameter of the projecting portions of the thin-film layer of each sample was measured, and an average area of the projecting portions was obtained from the measured value. The relationship between the average area and the relative durability at 40° and 95%RH is shown in FIG. 6. When each of the samples A to G was tested on a magnetic recording and reproducing apparatus having a rotary cylinder with a ferrite head at a relative speed between the tape and the head of 4 m/sec. and at a recording frequency of 5 MHz, the output difference between the samples was within 1 dB, which was within the range of allowable measuring errors, and the respective electromagnetic response properties of the samples were substantially equal to each other. In addition, the respective initial runability of the samples under various environments were substantially equal to each other.

As will be clear from FIG. 6, when the average area of the projecting portions of the thin-film layer is more than four times as large as the area of each of the particles of the shape imparting substance, the durability of the thin film magnetic recording medium under an environment at 40° and 95%RH is improved. If the average area of the projecting portions of the thin-film layer is more than ten times as large as the area of each of the particles of the shape imparting substance, then the durability is improved by a large margin.

As described above, it is possible according to this embodiment to improve the durability of the thin film magnetic recording medium while satisfying the requirements for electromagnetic response properties and runability provided that the average area of the projecting portions of the thin-film layer is more than four times as large as the area of each of the particles of the shape imparting substance.

Figure 7:
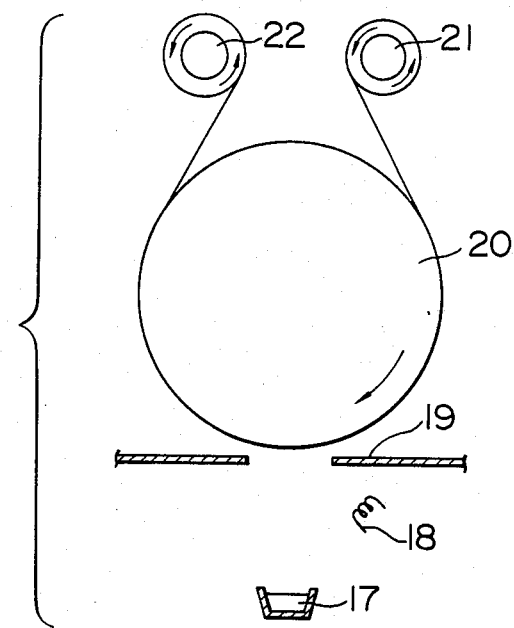
FIG. 7 shows the arrangement of one example of an apparatus for manufacturing the thin film magnetic recording medium according to the present invention.

Embodiment 2:

As the substrate, a polyethylene terephthalate substrate was employed having a thickness of 8 $\mu$m and an average surface roughness of 120 Å on the side thereof which was closer to the magnetic surface of the medium. As the shape imparting substance, polysulfone particles having an average particle diameter of 200 Å and a polyurethane resin were mixed in methyl alcohol and applied to the surface of the substrate. The particle density of the shape imparting substance was set at about 10 particles per $\mu m^2$. Then, deposition was made by employing a deposition apparatus having a heating source adapted to effect heating from one side of the apparatus, such as that shown in FIG. 7. In the Figure, the reference numeral 17 denotes an evaporation source which is capable of containing a deposition material, 18 a molybdenum heater, 19 a mask, 20 a water-cooled can with a diameter of 500 mm, 21 a supply shaft, and 22 a take-up shaft. With Pb employed as the deposition material, a Pb thin-film layer with a thickness of 1,000 Å was deposited on the surface of the substrate coated with the shape imparting substance by means of electron beam heating at a substrate travelling speed of 30 m/min. During the deposition, the molybdenum heater 18 was supplied with a current of 50 A at 10 V, thereby it was possible to offset from each other the center line of each of the particles of the shape imparting substance and the center line of the corresponding projecting portion of the Pb thin-film layer. The center line of each of the projecting portions of the Pb thin-film layer was offset from the center line of the corresponding particle of the shape imparting substance in the opposite direction relative to the heating source constituted by the molybdenum heater 18. Various samples were prepared by varying the position of the molybdenum heater 18 such that the angle $\theta$ (corresponding to the angle $\theta$ shown in FIG. 4) made between the substrate travelling direction and an imaginary line connecting between the center line of each of the projecting portions of the Pb thin-film layer and the center line of the corresponding particle of the shape imparting substance had various values, that is, $\theta = 0°$, 30°, 60°, 90°, 120°, 150° and 180°. Then, with these samples employed, CoNi (10 wt %) was deposited up to a minimum incident angle of 40° from the tangential direction along the water-cooled can with a diameter of 500 mm. In order to obtain proper magnetic properties, oxygen gas was introduced during the deposition. Consequently, the degree of vacuum during the deposition was 2 to $3 \times 10^{-3}$ Pa, and the film thickness of the thus formed magnetic layer was about 1,500 Å. These magnetic tapes were observed by employing a scanning electron microscope. The observation showed that the area of each of the projecting portions of the magnetic layer of each of the tapes was about eight times as large as the area of each of the particles of the shape imparting substance. Further, sputter etching was stepwisely effected from the magnetic layer surface side of each of the samples, and observation was carried out for every step of the etching with the scanning electron microscope. The observation showed that the offset distance between the center line of each of the particles of the shape imparting substance and the center line of the corresponding projecting portion of the thin-film layer was about 500 Å for all the samples, and it was confirmed that the offset angles $\theta$ between those center lines in relation to the samples were respectively 0°, 30°, 60°, 90°, 120°, 150° and 180° as described above.

Figure 8:
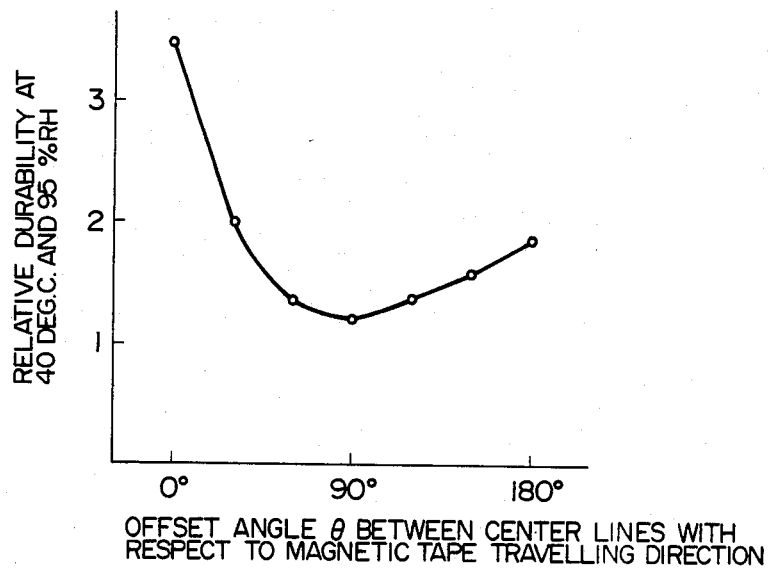
FIG. 8 is a characteristic chart showing improvements in the durability of the thin film magnetic recording medium in accordance with one practical embodiment of the present invention.

The respective surfaces of these samples were coated with a lubricant, and the samples were evaluated in terms of relative durability under an environment of 40° C. and 95%RH by employing a magnetic recording and reproducing apparatus having a rotary cylinder with a diameter of 40 mm. The magnetic tape employed as the reference for the evaluation was prepared such as to possess an arrangement similar to those of the other magnetic tapes but was not subjected to heating by means of the molybdenum heater 18 at the time of forming the Pb thin-film layer; therefore, in the reference magnetic tape, as shown in FIG. 1, the center line of each of the particles of the shape imparting substance was coincident with the center line of the corresponding projecting portion of the thin-film layer and the size of each projecting portion was substantially equal to that of each particle of the shape imparting substance. FIG. 8 shows the relationship between the offset angle $\theta$ and the relative durability of each of the samples at 40° and 95%RH, the offset angle 8 being made between the magnetic tape travelling direction and an imaginary line connecting between the center line of each of the particles of the shape imparting substance and the center line of the corresponding projecting portion of the thin-film layer. It is to be noted that the offset angle $\theta$ of 0° on the axis of abscissa in the graph shown in FIG. 8 exhibits that the magnetic head moves toward the center line of each of the particles of the shape imparting substance from the center line of the corresponding projecting portion of the thin-film layer, while the offset angle $\theta$ of 180° on the abscissa axis exhibits that the magnetic head moves in the opposite direction relative to the above. As will be clear from FIG. 8, in the case of a magnetic tape in which the center line of each of the particles of the shape imparting substance is not coincident with the center line of the corresponding projecting portion of the thin-film layer, it is possible to improve its durability even under a severe environment such as at 40° and 95%RH by properly selecting the travelling direction of the magnetic tape. It is to be noted that each of the reference and sample magnetic tapes was subjected to recording and reproducing operations at a recording wavelength 0.7 $\mu$m by employing a ferrite head. The testing showed that the reproduction output difference between the tapes was within 1 dB, which was within the range of allowable measuring errors, and the respective electromagnetic response properties of the tapes were substantially equal to each other, while their respective initial runability under various environments were also substantially equal to each other.

As described above, it is possible according to this embodiment to improve the durability of the thin film magnetic recording medium while satisfying the requirements for electromagnetic response properties and runability by arranging the medium such that the area of each of the projecting portions of the thin-film layer is more than four times as large as the area of each of the particles of the shape imparting substance and the center line of each of the particles of the shape imparting substance is made offset from the center line of the corresponding projecting portion of the thin-film layer.

Figure 9:
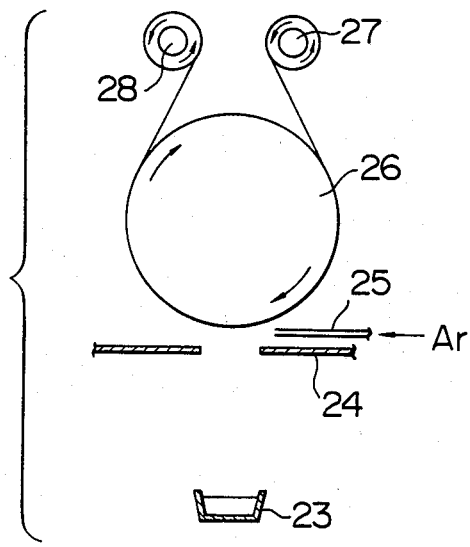
FIG. 9 shows the arrangement of another example of the apparatus for manufacturing the thin film magnetic recording medium according to the present invention.
Figure 10:
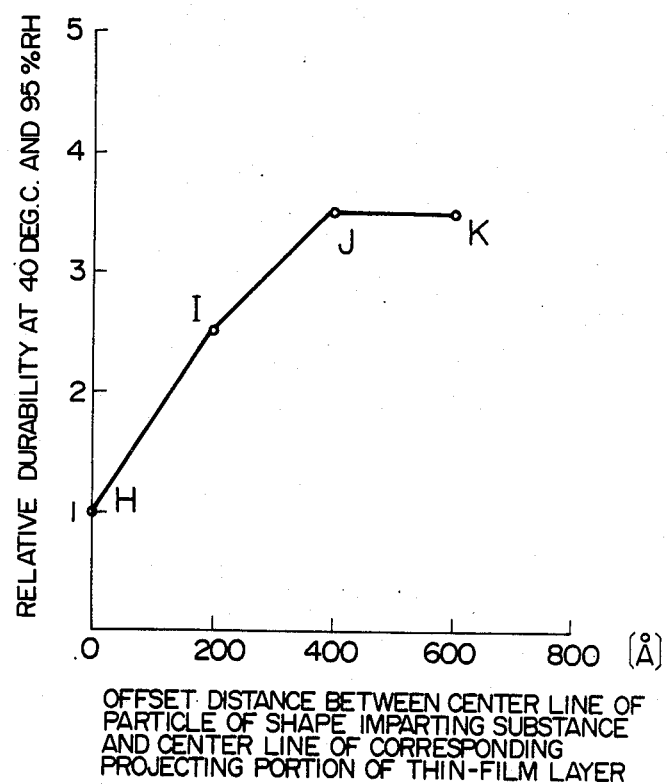
FIG. 10 is a characteristic chart showing improvements in the durability of the thin film magnetic recording medium in accordance with another practical embodiment of the present invention.

Embodiment 3:

As the substrate, a polyethylene terephthalate substrate was employed having a thickness of 7 $\mu$m and an average surface roughness of 60 Å on the side thereof which was closer to the magnetic surface of the medium. As the shape imparting substance, $SiO_2$ particles with an average particle diameter of 80 Å was mixed with Baylon resin and applied to the surface of the substrate at a particle density of about 20 particles per $\mu m^2$. Then, CoCr (20 wt %) with a film thickness of 5,000 Å was deposited on the surface of the substrate coated with the shape imparting substance in an AR gas atmosphere by employing a deposition apparatus such as that shown in FIG. 9. In the Figure, the reference numeral 23 denotes an evaporation source, 24 a mask, 25 an Ar gas inlet, 26 a water-cooled cylindrical can, 27 a supply shaft, and 28 a take-up shaft. The Ar gas was sidewardly blown in the vicinity of the deposition portion from a nozzle of 0.3 mm in diameter at the distal end of the Ar gas inlet 25 at various flow rates, that is, 0, 0.2, 0.4 and 0.6 Nl/min., whereby magnetic tapes H, I, J and K were obtained. The respective relative durabilities of the magnetic tapes under an environment of 40° and 95%RH were evaluated with respect to the durability of the magnetic tape H. Further, the cross-section of each of the magnetic tapes was observed by employing a scanning electron microscope so as to measure the offset distance between the center line of each of the particles of the shape imparting substance and the center line of the corresponding projecting portion of the thin-film layer. FIG. 10 shows the relationship between the offset distance between the above-described center lines and the durability of each of the magnetic tapes under an environment of 40° and 95%RH. In this case, the area of each of the projecting portions of the thin-film layer was slightly larger than the area of each of the particles of the shape imparting substance, but the former was two or less times as large as the latter. As will be clear from FIG. 10, by virtue of the arrangement in which the center line of each of the particles of the shape imparting substance is not coincident with the center line of the corresponding projecting portion of the thin-film layer, the durability of the magnetic tape under an environment of 40° and 95%RH is greatly improved. It is to be noted that the examination of the respective recording and reproducing characteristics of the magnetic tapes H, I, J and K at a recording wavelength of 0.7 μm by the use of an amorphous head showed that the reproduction output difference between the tapes was within 1 dB, which is within the range of allowable measuring errors, and their electromagnetic response properties were substantially equal to each other, and furthermore the respective initial runability of the tapes under various environments were also substantially equal to each other.

As described above, according to this embodiment in which the center line of each of the particles of the shape imparting substance is made offset from the center line of the corresponding portion of the thin-film layer, it is possible to improve the durability of the thin film magnetic recording medium while satisfying the requirements for electromagnetic response properties and runability.

Embodiment 4:

As the substrate, an aromatic polyimide substrate was employed having a thickness of 30 μm and an average surface roughness of 70 Å at the side thereof which was closer to the magnetic layer of the medium. As the shape imparting substance, $SiO_2$ with an average particle diameter of 60 Å was mixed with an epoxy resin and applied to the surface of the substrate at a particle density of about 10 particles per $\mu m^2$. Then, Zn with a film thickness of 2,000 Å was deposited on the surface of the substrate coated with the shape imparting substance by employing a deposition apparatus such as that shown in FIG. 7 which gradually increase the thickness of the film. Further, an $\alpha\text{-}Fe_2O_3$ layer containing 1.5% of Cu, 1% of Ti and 3% of Co was formed on the Zn to a thickness of 1,500 Å by sputtering in an oxygen atmosphere and was then reduced to $Fe_3O_4$ at 240°. The surface of the thus prepared sample was coated with a lubricant and formed into the shape of a floppy disk with a diameter of 3 inches. The evaluation of the durability of this disk under an environment of 40° and 95%RH showed that the disk displayed excellent durability without any abnormality occurring during the testing in which the disk was subjected to contact-start-stop operations a total of 500 times.

The analysis of the above-described sample by the use of a scanning electron microscope showed that each of the projecting portions of the thin-film layer had a shape with appropriate directional properties, and the area of each of the projecting portions of the thin-film layer was more than ten times as large as the area of each of the particles of the shape imparting substance, and further the offset distance between the center line of each of the projecting portions of the thin-film layer and the center line of the corresponding particle of the shape imparting substance was about 200 Å.

Embodiment 5:

As the substrate, a polyethylene terephthalate substrate was employed having a thickness of 10 μm and an average surface roughness of 40 Å on the side thereof which was closer to the magnetic surface of the medium, and as a ground treatment layer, a titanium film with an average film thickness of 200 Å was formed on the substrate by vacuum deposition. On the titanium layer was disposed carbon black with an average particle diameter of 100 Å by means of coating at a particle density of 20 particles per $\mu m^2$. Further, CoNi (20 wt %) was deposited on the carbon black up to a minimum incident angle of 50° from the tangential direction along a can with a diameter of 800 mm. During the deposition, oxygen and Ar were introduced at respective flow rates of 0.5 Nl/min. and 0.3 Nl/min., and ion plating was carried out at a degree of vacuum of $1.3 \times 10^{-3}$ Pa. As a result, each of the projecting portions thus formed at the surface of the CoNi layer had a shape with appropriate directional properties. The area of each of the projecting portions of the thin-film layer was more than 20 times as large as the area of each of the particles of the shape imparting substance. Further, the offset distance between the center line of each of the projecting portions of the thin-film layer and the center line of the corresponding particle of the shape imparting substance was 100 to 200 Å. A back coat layer was provided on the surface of this sample opposite to its magnetic surface, while a fluorine plasma polymerization film was formed on the magnetic surface, thereby forming a magnetic tape. The travelability of this magnetic tape was evaluated under an environment of 40° and 95%RH by employing a rotary cylinder type VTR. The evaluation showed that the magnetic tape displayed stable runability without causing any output fluctuation even after it had been run 100 times. Thus, it was found that the magnetic tape had satisfactory durability.

Embodiment 6:

Polyethylene terephthalate was coated with $SiO_2$ particles contained in a binder and was then subjected to drawing. The polyethylene terephthalate substrate thus formed had $SiO_2$ particles with an average particle diameter of 120 Å disposed on its surface at a particle density of five particles per $\mu m^2$. This sample was further provided with a CoNi layer, a back coat layer and a plasma polymerization layer in the manner shown in Embodiment 5, whereby the sample displayed satisfactory durability substantially equal to that of Embodiment 5.

It is to be noted that, although in the above-described embodiments practical effects have been shown in regard to six kinds of material, it has been confirmed that it is also possible for the thin film magnetic recording medium according to the present invention to obtain similar effects with other combinations of the above-described materials which constitute the described embodiments, or other magnetic materials.

As has been described above, the thin film magnetic recording medium according to the present invention has a shape imparting substance disposed on a substrate, and a thin-film layer formed on the shape imparting substance and including at least a magnetic layer, wherein the area of each of the projecting portions of the thin-film layer which are formed by virtue of the shape imparting substance is more than four times as large as the area of each of the particles of the shape imparting substance, or wherein the center line of each of the projecting portions of the thin-film layer which are formed by virtue of the shape imparting substance is made offset from the center line of the corresponding particle of the shape imparting substance. By virtue of this arrangement, it is possible to provide a thin film magnetic recording medium which displays excellent electromagnetic response properties and runability as well as durability even under a severe environment. Thus, the present invention offers great practical effects.

Although the invention has been described through specific terms, it is to be noted here that the described embodiments are not exclusive and various changes and modifications may be imparted thereto without departing from the scope of the invention which is limited solely by the appended claims.

What is claimed is:

1. A thin film magnetic recording medium comprising:
    shape imparting particles disposed on a substrate; and
    a thin-film layer including at least a magnetic layer formed on said shape imparting particles,
    wherein the center line of each of the projecting portions of said thin-film layer which are formed by virtue of said shape imparting particles is not coincident with the center line of the corresponding shape imparting particle.

2. A thin film magnetic recording medium comprising:
    shape imparting particles disposed on a substrate; and
    a thin-film layer including at least a magnetic layer formed on said shape imparting particles,
    wherein the area of each of the projecting portions of said thin-film layer which are formed by virtue of said shape imparting particles is ten or more times as large as the area of each of the shape imparting particles, and wherein the center line of each of the projecting portions of said thin-film layer is not coincident with the center line of the corresponding shape imparting particle.

* * * * *